(12) United States Patent
Baur et al.

(10) Patent No.: US 8,145,382 B2
(45) Date of Patent: Mar. 27, 2012

(54) ENTERTAINMENT SYSTEM INCLUDING A VEHICLE

(75) Inventors: Andrew W. Baur, Waterford, MI (US); Tony L. Koenigsknecht, Royal Oak, MI (US)

(73) Assignee: Greycell, LLC, Waterford, MI (US)

( * ) Notice: Subject to any disclaimer, the term of this patent is extended or adjusted under 35 U.S.C. 154(b) by 624 days.

(21) Appl. No.: 12/264,251

(22) Filed: Nov. 3, 2008

(65) Prior Publication Data

US 2009/0125161 A1   May 14, 2009

Related U.S. Application Data

(63) Continuation-in-part of application No. 11/156,218, filed on Jun. 17, 2005, now Pat. No. 7,657,358.

(60) Provisional application No. 61/001,528, filed on Nov. 3, 2007, provisional application No. 61/003,898, filed on Nov. 23, 2008, provisional application No. 61/006,167, filed on Dec. 26, 2008.

(51) Int. Cl.
G06F 19/00   (2011.01)

(52) U.S. Cl. ........... 701/36; 701/1; 701/70; 709/220; 180/291; 345/660; 369/1; 381/86; 434/69

(58) Field of Classification Search .......... 701/1, 70; 709/220; 180/291; 345/660; 369/1; 381/86; 434/69

See application file for complete search history.

(56) References Cited

U.S. PATENT DOCUMENTS

| | | |
|---|---|---|
| 2,909,853 A | 10/1959 | Port |
| 3,425,156 A | 2/1969 | Field |
| 3,542,934 A | 11/1970 | Frizell et al. |
| 3,722,884 A | 3/1973 | Brown |
| 3,734,497 A | 5/1973 | Brown |
| RE27,984 E | 4/1974 | Ravich |
| 4,218,834 A | 8/1980 | Robertsson |
| 4,219,962 A | 9/1980 | Dankman et al. |
| 4,291,877 A | 9/1981 | Ensmann et al. |
| 4,425,097 A | 1/1984 | Own |
| 4,642,066 A | 2/1987 | Kennedy et al. |
| 4,660,528 A | 4/1987 | Buck |
| 4,728,104 A | 3/1988 | Cheng |
| 4,817,948 A | 4/1989 | Simonelli |
| 4,920,890 A | 5/1990 | Barber |
| 4,926,161 A | 5/1990 | Cupp |
| 4,964,837 A | 10/1990 | Collier |
| 5,053,768 A | 10/1991 | Dix, Jr. |
| 5,088,955 A | 2/1992 | Ishimoto |
| 5,184,694 A | 2/1993 | Magrath et al. |
| 5,195,920 A | 3/1993 | Collier |

(Continued)

OTHER PUBLICATIONS

U.S. Appl. No. 12/645,105, filed Dec. 2009, Andrew Baur.

*Primary Examiner* — James Trammell
*Assistant Examiner* — Sanjeev Malhotra
(74) *Attorney, Agent, or Firm* — Jeffrey Schox

(57) ABSTRACT

The entertainment system of one of the preferred embodiments includes a recreational vehicle, an event sensor attached to the recreational vehicle, an event element able to be detected by the event sensor, a processor connected to the event sensor, and a game program operated by the processor. The entertainment system functions to enable interactive game-like capabilities for a movable vehicle. The entertainment system is preferably used for children recreational vehicles (miniature cars), but may alternatively be used by other vehicles.

16 Claims, 8 Drawing Sheets

U.S. PATENT DOCUMENTS

| | | |
|---|---|---|
| 5,203,563 A | 4/1993 | Loper, III |
| 5,292,254 A | 3/1994 | Miller et al. |
| 5,299,810 A | 4/1994 | Pierce et al. |
| 5,361,705 A | 11/1994 | Powell |
| 5,382,958 A | 1/1995 | FitzGerald |
| 5,415,549 A | 5/1995 | Logg |
| 5,435,553 A | 7/1995 | Arima et al. |
| 5,556,281 A | 9/1996 | FitzGerald et al. |
| 5,586,187 A | 12/1996 | Webb |
| 5,635,903 A | 6/1997 | Loike et al. |
| 5,695,341 A | 12/1997 | FitzGerald et al. |
| 5,707,237 A | 1/1998 | Takemoto et al. |
| 5,788,500 A | 8/1998 | Gerber |
| 5,835,605 A | 11/1998 | Kunimoto |
| 5,865,624 A | 2/1999 | Hayashigawa |
| 5,913,378 A | 6/1999 | Brister |
| 5,921,780 A * | 7/1999 | Myers ............................ 434/69 |
| 5,990,880 A * | 11/1999 | Huffman et al. .............. 345/660 |
| 6,170,596 B1 * | 1/2001 | Triarsi et al. .................. 180/291 |
| 6,179,331 B1 | 1/2001 | Jones et al. |
| 6,254,394 B1 | 7/2001 | Draper et al. |
| 6,254,486 B1 | 7/2001 | Mathieu et al. |
| 6,302,421 B1 | 10/2001 | Lee |
| 6,386,879 B1 | 5/2002 | Varshneya et al. |
| 6,411,887 B1 | 6/2002 | Martens |
| 6,450,817 B1 | 9/2002 | Deinlein |
| 6,553,288 B2 | 4/2003 | Taguchi |
| 6,859,539 B1 | 2/2005 | Maeda |
| 6,959,094 B1 | 10/2005 | Cascone et al. |
| 7,243,053 B1 | 7/2007 | Small |
| 7,402,964 B1 | 7/2008 | Calhoun |
| 7,601,064 B2 | 10/2009 | Akita |
| 7,657,358 B2 * | 2/2010 | Baur et al. ...................... 701/70 |
| 7,764,800 B2 | 7/2010 | Maeda |
| 2001/0029011 A1 | 10/2001 | Dagani et al. |
| 2003/0079207 A1 | 4/2003 | Xavier et al. |
| 2004/0033472 A1 | 2/2004 | Varshneya |
| 2004/0165734 A1 * | 8/2004 | Li ..................................... 381/86 |
| 2004/0184359 A1 * | 9/2004 | Li ....................................... 369/1 |
| 2005/0034904 A1 | 2/2005 | Huntsberger et al. |
| 2005/0155441 A1 | 7/2005 | Nagata |
| 2005/0186884 A1 | 8/2005 | Evans |
| 2005/0198228 A1 * | 9/2005 | Bajwa et al. ................... 709/220 |
| 2006/0004495 A1 * | 1/2006 | Baur et al. ........................ 701/1 |
| 2006/0148546 A1 | 7/2006 | Inoue et al. |
| 2007/0246271 A1 | 10/2007 | Lucas et al. |
| 2007/0287537 A1 | 12/2007 | Yu |
| 2008/0060861 A1 | 3/2008 | Baur et al. |
| 2008/0132143 A1 | 6/2008 | Miyaura |
| 2009/0125161 A1 | 5/2009 | Baur et al. |
| 2009/0156088 A1 | 6/2009 | Mukaida |

* cited by examiner

ENTERTAINMENT SYSTEM INCLUDING A VEHICLE

CROSS-REFERENCE TO RELATED APPLICATIONS

This application is a continuation-in-part of prior application Ser. No. 11/156,218, filed 17 Jun. 2005. This application also claims the benefit of U.S. Provisional Application No. 61/001,528, filed 3 Nov. 2007, U.S. Provisional Application No. 61/003,898, filed 23 Nov. 2007, and U.S. Provisional Application No. 61/006,167, filed 26 Dec. 2007. The parent application and the three provisional applications are all incorporated in their entirety by this reference.

TECHNICAL FIELD

This invention relates generally to the entertainment field, and more specifically to a new and useful entertainment system and method for an interactive vehicle experience.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. First Preferred Embodiment of the Entertainment System

Figure 1:
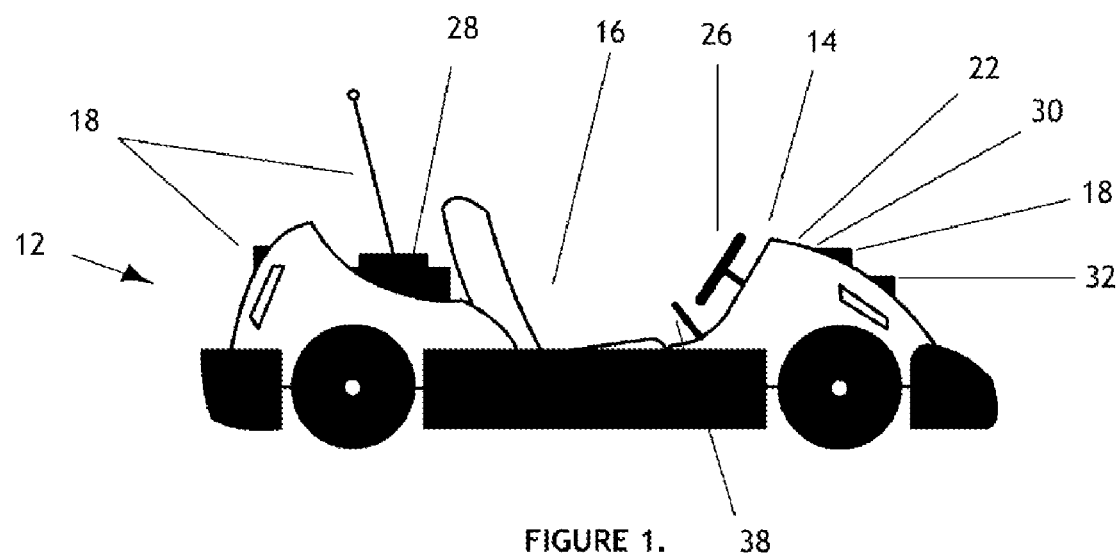
FIG. 1 is a representation of the first variation of the first vehicle of the first preferred embodiment of the invention, including a user interface, a first user, an event sensor, a processor, a steering subsystem, a propulsion subsystem, an activation device, a memory device, and a simulated weapon.
Figure 2:
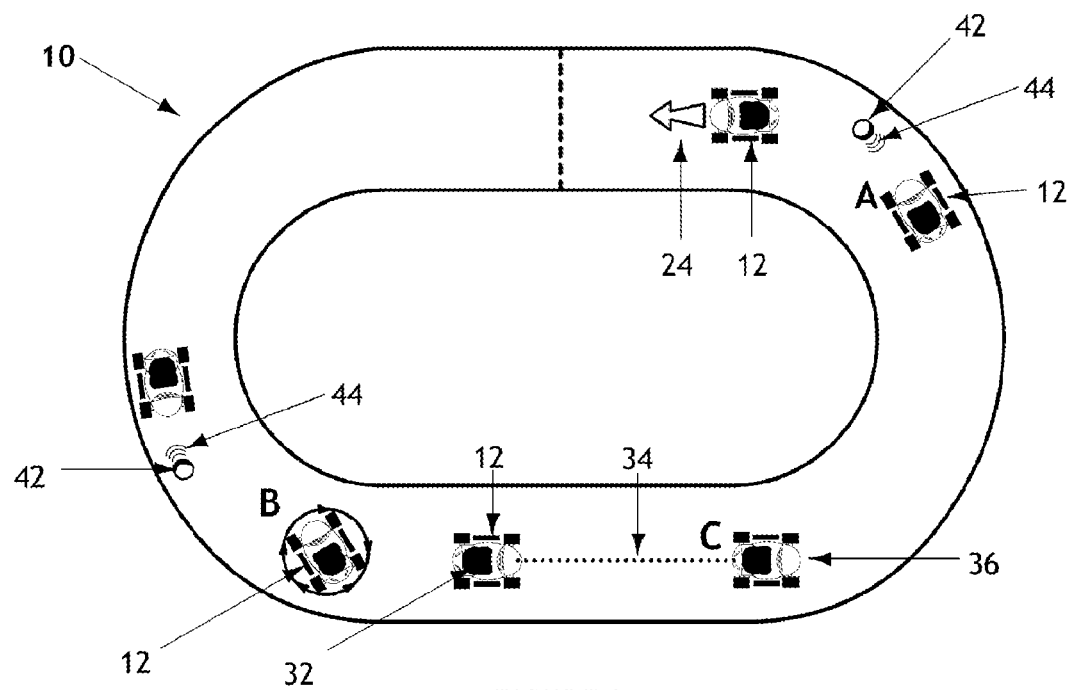
FIG. 2 is a first variation of the entertainment system configured as a simple land course.

As shown in FIGS. 1 and 2 the entertainment system 10 of the first preferred embodiment includes a first vehicle 12 including a user interface 14 adapted to accept a vehicle input from a first user 16. The first vehicle 12 further includes an event sensor 18 adapted to sense a first trigger event, and a processor 22 adapted to operate in the following modes: normal mode and simulation mode. In the normal mode, the processor 22 controls the first vehicle 12 based substantially on the vehicle input from the first user 16. In the simulation mode, the processor 22 controls the first vehicle 12 based on a modification of the vehicle input from the first user 16 according to a first rule, which simulates a first physical event.

The first vehicle 12 of the first preferred embodiment functions to transport the first user 16. Preferably, the first vehicle 12 is a four-wheel cart. Alternatively, the first vehicle 12 may be another wheeled vehicle (such as a motorcycle or a bicycle), a watercraft (such as a bumper boat, a jet ski, or a motorboat), an aircraft (such as a small plane or a hovercraft), a tracked vehicle (such as a snowmobile or a tank), or a railed vehicle (such as a train), or a wind, gravity, or human-powered vehicle (such as a kiteboard, a snowboard, or a skateboard). The first vehicle 12 may, however, be any suitable vehicle that transports the first user 16.

In the first preferred embodiment, the first vehicle 12 further includes a steering subsystem 26. The steering subsystem 26 functions to allow steering of the first vehicle 12. Preferably, the steering subsystem 26 includes mechanisms to turn the wheels of a wheeled vehicle or to turn the impeller of a water vehicle, but the steering subsystem 26 may include any suitable device or system to steer the first vehicle 12. The steering subsystem 26 also preferably includes a disabled mode that reduces or completely eliminates the control of the first user over the steering of the first vehicle 12. In a first variation, the disable mode is accomplished through the deactivation of a "drive-by-wire" steering device. In a second variation, the disabled mode is accomplished through the lowering of a caster (or other suitable device) that prevents the wheels or impeller from effectively turning the first vehicle 12. The steering subsystem 26 may include any suitable device that reduces or completely eliminates the control of the first user over the steering of the first vehicle 12.

In the first preferred embodiment, the first vehicle 12 further includes a propulsion subsystem 28. The propulsion subsystem 28 functions to propel the first vehicle 12. Preferably, the propulsion subsystem 28 includes an electrical battery and an electric motor that is connected to the wheels or impeller of the first vehicle 12. Alternatively, the propulsion system 28 may include an internal combustion engine connected to the wheels or impeller of the first vehicle 12, or may include a device or system to harness wind, gravity, or human power (such as a sail, low-resistance wheels, or pedals). Further, the propulsion system may include any suitable device or system to steer the first vehicle 12. Like the steering subsystem 26, the propulsion subsystem 28 preferably includes a disabled mode that reduces or completely eliminates the control of the first user over the propulsion of the first vehicle 12. In a first variation, the disable mode is accomplished through the deactivation of a "drive-by-wire" throttle device. In a second variation, the disabled mode is accomplished through the lowering of a caster (or other suitable device) that prevents the wheels or impeller from effectively propelling the first vehicle 12. The propulsion subsystem 28 may include any suitable device that reduces or completely eliminates the control of the first user over the propulsion of the first vehicle 12.

In the first preferred embodiment, the entertainment system 10 further includes multiple vehicles, including a second vehicle 36. Like the first vehicle 12, the second vehicle 36 preferably includes a user interface adapted to accept a vehicle input from a second user, an event sensor adapted to sense a first trigger event, and a processor connected to the user interface and the event sensor and adapted to operate in the following modes: normal mode and simulation mode. In normal mode, the processor controls the second vehicle 36 based substantially on the vehicle input from the second user. In simulation mode, the processor controls the second vehicle 36 based on a modification of the vehicle input from the second user according to a first rule, which simulates a first physical event. The second vehicle 36 further preferably includes a steering subsystem and a propulsion subsystem. The second vehicle 36 is preferably one of the several variations of the first vehicle 12, but may alternatively be any suitable vehicle. Further, although the second vehicle 36 is preferably driven by a human, the second vehicle may be controlled from a distance by another human or by a machine. Further still, although the second vehicle 36 is preferably tangible, the second vehicle 36 may be virtually displayed to the first user 16.

The user interface 14 of the first preferred embodiment functions to accept the vehicle input from the first user 16 and communicate with the processor 22. The user interface 14 preferably includes one or more of the following subsystems: a steering device to accept steering input (such as a steering wheel, handlebars, a rudder, or any other suitable steering devices), acceleration and deceleration devices to accept acceleration and/or velocity input and deceleration input (such as throttles or brakes adapted for hand or foot activation, or any other suitable acceleration and deceleration devices), and an activation device 38 to accept other inputs (such as a touch screen, voice recognition, or any other suitable means of accepting input from the first user 16). The user interface 14 may also further include feedback devices to communicate information from the first vehicle 12 to the first user 16 (such as LCD screens that indicate items collected or fuel level, or any other suitable communication device), and/or tactile devices to provide other feedback to the first user 16 (such as a rumble seat, a vibrating steering device, or any other suitable means of providing tactile feedback). The user interface 14 may include any suitable combination and permutation of these various devices.

The event sensor 18 of the first preferred embodiment functions to sense a first trigger event. In a first variation, the event sensor 18 is a contact switch that senses physical contact between the first vehicle 12 and another object (such as a physical barrier or a second vehicle). In a second variation, the event sensor 18 is a receiver that receives wireless signals (such as IR signals, RF signals, or other suitable wireless signals). The event sensor 18 of the second variation may be further adapted to transmit an acknowledgement signal upon successful receipt of a wireless signal. In a third variation, the event sensor 18 is a magnetic sensor that senses a change in the magnetic field. While the event sensor 18 is preferably one of these variations, the event sensor 18 may alternatively be any other suitable sensor to sense a first trigger event. The first vehicle 12 preferably includes either a single event sensor 18 that is adapted to sense multiple trigger events, or multiple event sensors 18 each adapted to sense one or more trigger events.

Figure 3:
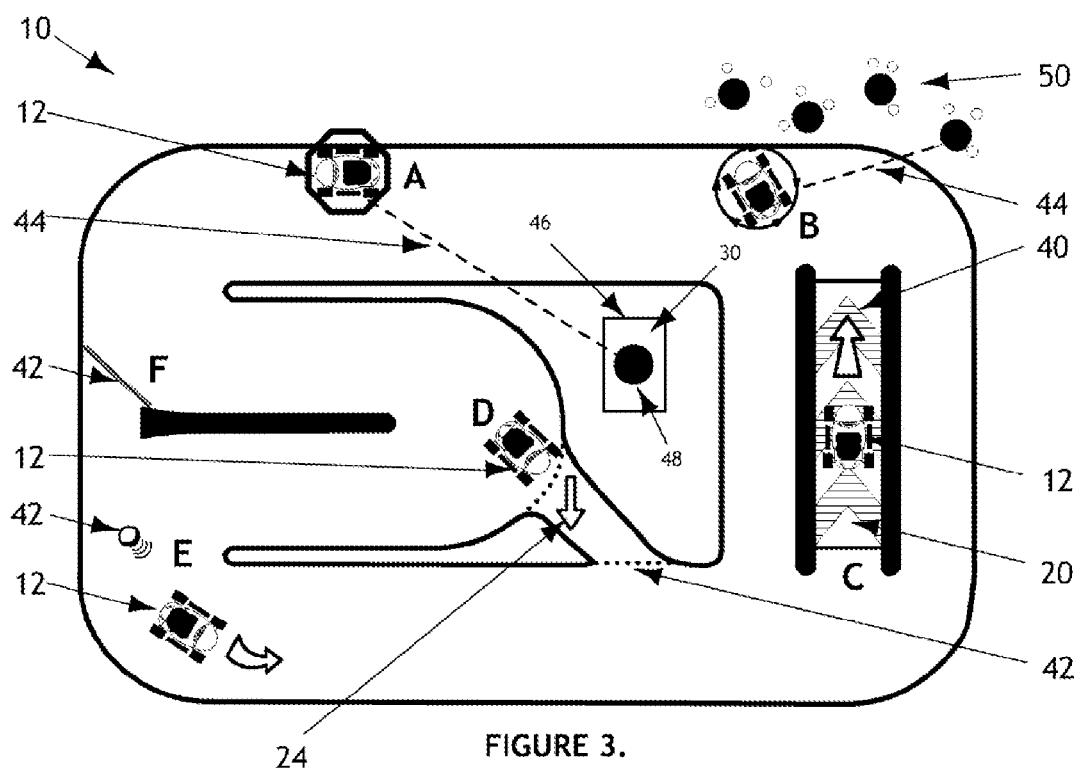
FIG. 3 is a second variation of the entertainment system configured as an advanced land course.

The processor 22 of the first preferred embodiment is connected to the user interface 14 and to the event sensor 18. The processor 22 is preferably a digital controller, but may alternatively be an analog controller, a mechanical controller, or any other suitable controller. The processor 22 is preferably located in the first vehicle 12, but may alternatively be located in a remote area. Further, if located in a remote area, the processor 22 may be a central processor 46, separate from the first vehicle 12 and the second vehicle 36, and adapted to function as the processor 22 for both the first vehicle 12 and second vehicle 36 (as shown in FIG. 3). The processor 22 is adapted to operate the vehicle in normal mode wherein the processor 22 controls the first vehicle 12 based substantially on the vehicle input from the first user 16. The processor 22 is also adapted to operate the vehicle in simulation mode wherein the processor 22 controls the first vehicle 12 based on a modification of the vehicle input from the first user 16 according to a first rule. The processor 22 in the simulation mode preferably controls the steering subsystem 26 and/or the propulsion subsystem 28. In a first variation, the processor 22 transitions from normal mode to simulation mode upon the sensing by the event sensor 18 of the first trigger event. In a second variation, the processor 22 transitions from normal mode to simulation mode upon the sensing by the event sensor 18 of the first trigger event and the activation by the user of the activation device 38. In a third variation, the processor 22 transitions from normal mode to simulation mode upon the sensing by the event sensor 18 of a first trigger event, and the processor 22 transitions from simulation mode to normal mode upon the sensing by the event sensor 18 of a second trigger event. In a fourth variation, the processor 22 does not transition from a normal mode to a simulation mode upon the sensing by the event sensor 18 of a first trigger event if the sensing by the event sensor 18 of a second trigger event has occurred first. While the processor 22 is preferably includes one or more of these variations, the processor 22 may alternatively be any other suitable connection between the user interface 14 and the event sensor 18.

In the first preferred embodiment, the first vehicle 12 further includes a memory device 30 adapted to store the trigger events. The memory device 30 functions to store the trigger events and other suitable events (such as placement or rank) experienced by the first user 16 during a particular round. With this feature, the first user 16 may retrieve the stored events thereby affecting the normal mode of the processor 22 for the first vehicle in subsequent rounds. In the first variation, the memory device 30 is included in the first vehicle. In a second variation, the memory device 30 is separate from the first vehicle 18 and the second vehicle 36 (as shown in FIG. 3). The memory device 30 of these variations is preferably a conventional memory chip, such as RAM, but may alternatively be any suitable device able to store information.

In the first preferred embodiment, the first vehicle 12 further includes a simulated weapon 32 adapted to be controlled by the first user 16 and adapted to transmit one or more weapon signals 34. The simulated weapon 32 functions to allow the first user 16 (or another passenger in the first vehicle 12) to affect the vehicles of the other users in the entertainment system 10 and/or the environment itself. The simulated weapon 32 is adapted to transmit a weapon signal 34. The weapon signal 34 simulates the ammunition from the simulated weapon 32. Preferably, the weapon signal 34 is a wireless signal. Alternatively, the weapon signal 34 may be an analog signal transmission (where the weapon signal 34 closes a circuit or switch, or interrupts a light beam or laser), a physical element (such as air, water, or any other suitable medium), or a combination of a wireless signal and a physical element. The weapon signal 34 is preferably one of these variations, but alternatively may be any other suitable signal.

As shown in FIGS. 2 and 3, the entertainment system 10 of the first preferred embodiment also includes an event element 42, which functions to initiate a trigger event. The event element 42 is preferably separate from the first vehicle 12 and is preferably located on an area of the track. The event element may be continuous (such as the physical barrier that surrounds the track), may be an extended zone (such as a zone within the track), or may be a particular point. The event element 42 may be stationary or movable.

The event element 42 of the first preferred embodiment is preferably adapted to be controlled either by a central processor or by an internal processor. The event element 42, however, is also preferably adapted to be modified by a moderator 48, a spectator 50, the first user 16, and/or a second user. The moderator 48 preferably moderates the use of the entertainment system 10. The moderator 48 may be provided with a command center or handheld device that is wirelessly connected or wired to the entertainment system 10 and includes buttons, voice recognition and activation, a touch screen, or any other suitable means to provide input to the entertainment system 10. The spectator 50 is preferably a visitor to the entertainment system 10. The spectator 50 may be provided with a tabletop or handheld device that is wirelessly connected or wired to the entertainment system 10 and that includes control buttons, voting buttons, voice recognition and activation, a touch screen or any other suitable means to provide input to the entertainment system 10.

The event element 42 of the first preferred embodiment is one of several variations. In a first variation, the event element 42 is a physical barrier. In a second variation, the event element 42 is a transmitter that transmits a wireless signal 44 (such as an IR signal, an RF signal, an ultrasonic or acoustic signal, or a GPS or satellite signal). In a third variation, the event element 42 is a transmitter that transmits a physical element (such as water, air, or any other suitable physical element). The wireless signal 44 of the second variation and the physical element of the second variation are both intended to be received by the event sensor 18 of the first vehicle 12. The event element 42 of the second and third variation may be further adapted to receive an acknowledgement signal from an event sensor 18. The event element 42 of the second and third variations may be further adapted to temporarily cease transmission of the wireless signal 44 and the physical element upon the successful receipt of the acknowledgement signal from the event sensor 18. The event element 42 of the second and third variation may be further adapted to transmit both a wireless signal and a physical element. In a fourth variation, the event element 42 is a magnetic device that induces a change in the magnetic field. The event element 42 and the signal 44 are both preferably one of the variations described but may be any suitable element and signal.

The first trigger event of the first preferred embodiment functions to initiate the modification of the vehicle inputs, which simulates a physical event (either a "positive" event or a "negative" as viewed by the first user). The first trigger event is preferably a communication between the event element 18 and the event sensor (such as a physical connection or a wireless communication).

The first physical event of the first preferred embodiment functions to simulate an event in the "real world." A first physical event occurs when the processor 22 operates in the simulation mode. In the simulation mode, the processor 22 controls the steering subsystem 26 and/or the propulsion subsystem 28 based on a modification of the vehicle input from the first user 16 according to a first rule. In a first variation, the first rule is a reduction of the vehicle input to the steering subsystem 26, which results in a first physical event distinguished by reduced control of the first vehicle 12 by the first user 16 and which simulates driving through an area with reduced traction (such as ice or oil). In a second variation, the first rule is a reduction of the vehicle input to the propulsion subsystem 28, which results in a first physical event distinguished by reduced acceleration (or top velocity) of the first vehicle 12 and which simulates driving into a head wind or through difficult terrain (such as mud or sand). In a third variation, the first rule is a complete reduction of the vehicle input, which results in a first physical event distinguished by complete lack of control of the first vehicle 12 by the first user 16 and which simulates a crashed, disabled, or low-energy (or low-power) vehicle. In a fourth variation, the first rule is an increase in the vehicle input to the propulsion subsystem 28, which results in a first physical event distinguished by increased acceleration (or top velocity) of the first vehicle 12 and which simulates driving with a tail wind or through easy terrain (such as smooth concrete). With any of these variation 2, the first rule may be applied for a given time period, until a second trigger event occurs, or based on any other suitable parameter. In other variations, the first rule may include any suitable modification of the vehicle input to simulate an event in the "real world."

As shown in FIG. 2, the entertainment system 10 of the first preferred embodiment may be configured as a land course with interactive (or "combative") racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the transmission of a wireless signal 44 from the event element 42 to the event sensor in the first vehicle 12. The rule applied by the processor is an increase in the top velocity of the first vehicle 12, which simulates a turbo boost. On the "B section" of the course, the trigger event is a transmission of a wireless signal 44 from the event element 42 to the event sensor in the first vehicle 12. The rule applied by the processor is a decrease in the stability of the steering subsystem, which simulates an oil slick or ice patch. On the "C section" of the course, the trigger event is a transmission of a weapon signal 34 from the simulated weapon 32 on the first vehicle 12 to the event sensor on the second vehicle 36. The rule applied by the processor of the second vehicle 36 is a complete reduction of the vehicle input, which simulates a disabled or damaged vehicle.

As shown in FIG. 3, the entertainment system 10 of the first preferred embodiment may be configured as an advanced land course. The entertainment system 10 preferably includes multiple versions of vehicles, event elements, signals, event sensors, trigger events, rules, and physical events as described below. The entertainment system 10 also preferably includes controls for a moderator 48 and/or a spectator 50, a variation of the memory device 30, and the central processor 46. The entertainment system 10 may, however, include other suitable combinations of event elements, signals, event sensors, trigger events, rules, and physical events.

On the "A section" of the course, the trigger event is the transmission of a wireless signal 44 from the event element 42 (controlled by the moderator 48) to the event sensor of the first vehicle 12. The rule applied by the processor of the first vehicle 12 is a complete reduction of the vehicle input, which simulates a disabled or damaged vehicle. On the "B Section" of the course, the trigger event is the transmission of a wireless signal 44 from the event element 42 (controlled by the spectator 50) to the event sensor of the first vehicle 12. The rule applied by the processor is a decrease in the stability of the steering subsystem, which simulates an oil slick. On the "C Section" of the course, the trigger event is the creation of a magnetic field by the event element and the sensing of the magnetic field by the event sensor of the first vehicle 12 (at point 20). The rule applied by the processor is an increase in the top velocity of the first vehicle 12, which simulates a tail wind. Preferably, the rule is no longer applied when the event sensor no longer senses the magnetic field (at point 40). On the "D Section" of the course, the trigger event is the creation of a magnetic field by the event element and the sensing of the magnetic field by the event sensor of the first vehicle 12. The rule applied by the processor is a decrease in the top velocity of the first vehicle 12, which simulates a difficult terrain.

Preferably, the rule is no longer applied when the event sensor no longer senses the magnetic field. On the "E Section" of the course, the event trigger is a transmission from the event element 42 to the event sensor of the first vehicle 12. The first vehicle provides a feedback signal to the first user that an item has been collected and allows later activation of the item through the activation device. The event sensor transmits an acknowledgement signal to the event element 42, which temporarily ceases the transmission of the signal from the event element 42. On the "F Section" of the course, the event trigger is the contact of the vehicle with a closed gate. The rule applied by the processor of the first vehicle 12 is a reduction of the top speed of the vehicle input, which simulates a damaged vehicle. Preferably, the processor does not apply this rule if the first user has previously collected a "gate key" item.

Figure 4:
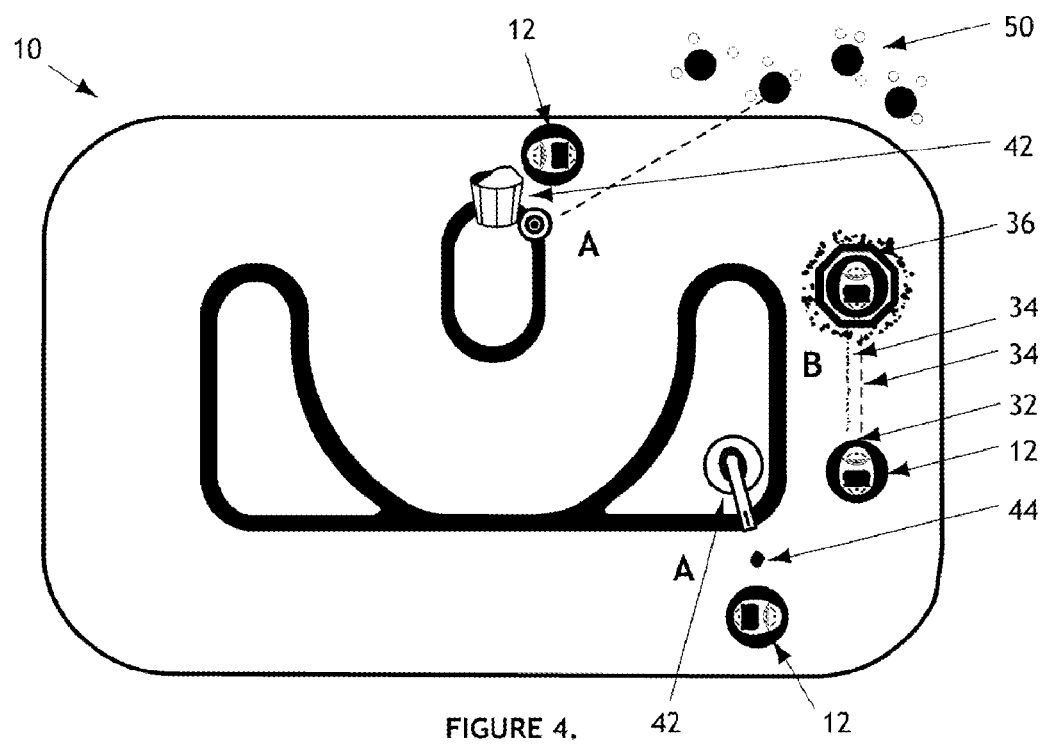
FIG. 4 is a third variation of the entertainment system configured as a water course.

As shown in FIG. 4, the entertainment system 10 of the first preferred embodiment may be configured as a water course with interactive (or "combative") racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the transmission of a wireless signal 44 from the event element 42 (controlled by the spectator 50) to the event sensor of the first vehicle 12. The rule applied by the processor of the first vehicle 12 is a partial reduction of the vehicle input, which simulates a damaged vehicle. In addition to transmitting a wireless signal, the event element 42 shoots water, which further increases the realism that the event element 42 is damaging the vehicle.

On the "B section" of the course, the trigger event is the transmission of a weapon signal 34 from the event element 42 (controlled by the second user of the second vehicle 36) to the event sensor of the first vehicle 12. The rule applied by the processor of the first vehicle 12 is a complete reduction of the vehicle input, which simulates a disabled vehicle. In addition to transmitting a weapon signal 34, the simulated weapon shoots water, which further increases the realism that the simulated weapon is damaging the first vehicle 12.

Figure 5:
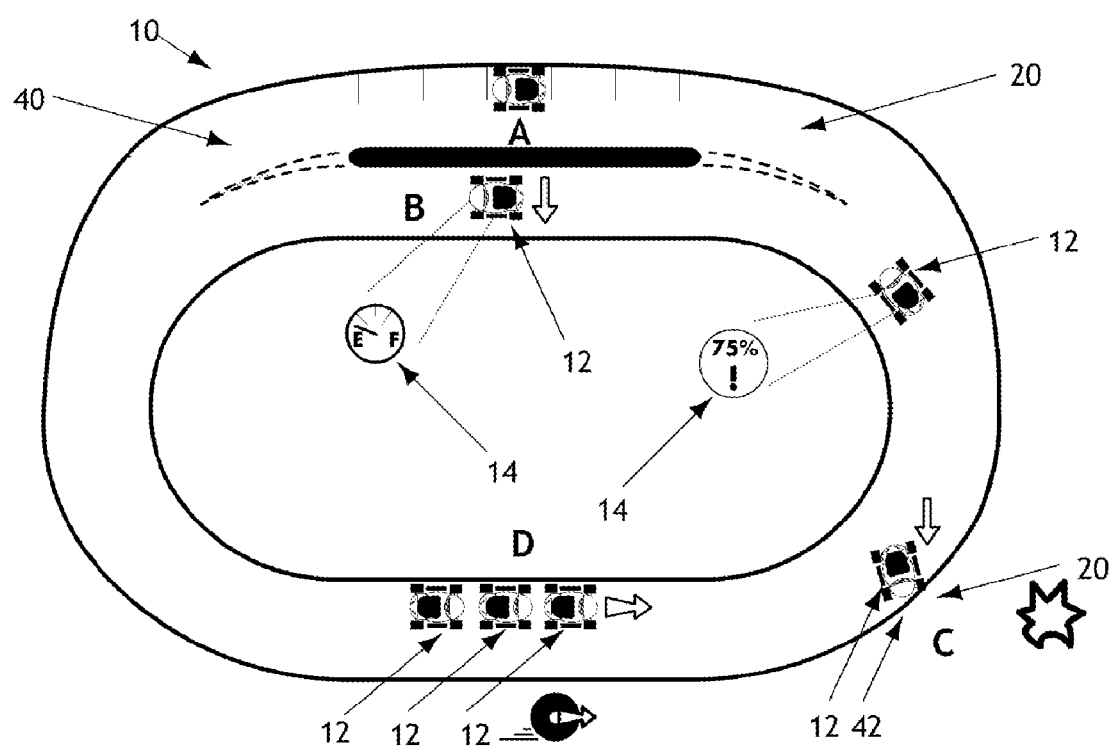
FIG. 5 is a fourth variation of the entertainment system configured as a "closed circuit" land course.

As shown in FIG. 5, the entertainment system 10 of the first preferred embodiment may be configured as a "closed circuit" land course with "Stock Car" style racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the usage of energy or the passage of time. The rule applied by the processor of the first vehicle 12 is a reduction of the top speed of the vehicle input, which simulates a vehicle with low available energy. On the "B Section" of the course, the trigger event is the contact of the first vehicle 12 with the physical barrier. The rule applied by the processor of the first vehicle 12 is a reduction of the top speed of the vehicle input, which simulates a damaged vehicle. These two rules are applied until the end of the round or until the event sensor senses that the first vehicle 12 has entered the "C Section" (also referred to as the "pit stop" area) of the course (which initiates a second trigger event). On the "D Section" of the course, the trigger event is the presence of two or more vehicles traveling in a line at close proximity above a minimum speed. The rule applied to the processor(s) of one or more of these vehicles is the increase of the top speed of the vehicle(s), which simulates a drafting technique used in sports racing to reduce the overall effect of drag resistance of the vehicles.

Although omitted for conciseness, the first preferred embodiment includes every combination and permutation of the various vehicles, the various event elements, the various trigger events, the various rules, and the various physical events.

2. Second Preferred Embodiment of the Entertainment System

Figure 6:
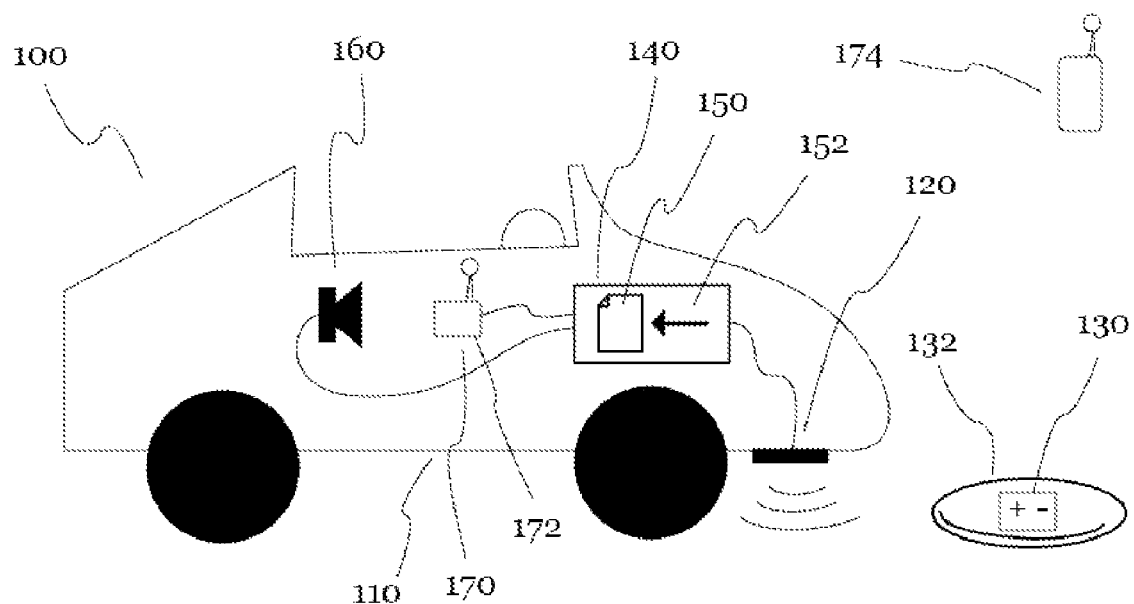
FIG. 6 is a schematic view of the vehicle of the second preferred embodiment of the invention.

As shown in FIG. 6 the entertainment system 100 of the second preferred embodiment includes a recreational vehicle 110, an event sensor 120 attached to the recreational vehicle 110, an event element 130 able to be detected by the event sensor 110, a processor 140 connected to the event sensor 120, and a game program 150 operated by the processor 140. The entertainment system 100 functions to enable interactive game-like capabilities for a movable vehicle. The entertainment system is preferably used for children recreational vehicles (miniature cars with electric motors), but may alternatively be used by another wheeled vehicle (such as a motorcycle or a bicycle), a watercraft (such as a bumper boat, a jet ski, or a motorboat), an aircraft (such as a small plane or a hovercraft), a tracked vehicle (such as a snowmobile or a tank), or a railed vehicle (such as a train), or a wind, gravity, or human-powered vehicle (such as a kiteboard, a snowboard, or a skateboard). Although described as a complete package (with a vehicle), the entertainment system can be packaged and sold as a retro-fit kit for existing recreation vehicles (such as the POWER WHEELS recreational vehicles sold and marketed by Fisher Price). In this scenario, the kit would include an event sensor 120 that attaches to an existing recreational vehicle, an event element 130 able to be detected by the event sensor 110, a processor 140 connected to the event sensor 120, and a game program 150 operated by the processor 140.

The recreational vehicle 110 of the second preferred embodiment functions to transport a user. The recreational vehicle 110 is preferably a children ride-on vehicle, similar to U.S. Pat. Nos. 4,709,958 (entitled "Ridable vehicle and assembly method" and issued on 1 Dec. 1987) and 6,508,320 (entitled "Children's ride-on vehicle and bucket assembly" and issued on 21 Jan. 2003), which are both incorporated in their entirety by this reference. The recreational vehicle 110 preferably includes an electric motor and an electric power source (such as a battery), but may alternatively include any suitable source of propulsion and power. Preferably, the recreational vehicle 100 contains the event sensor 120, the processor 140, and the game program 150. The recreational vehicle may additionally contain a communication system 170, a game interface (audio, video, vibration feedback) 160, a control system to alter the driving performance of the vehicle, and/or any suitable device. Alternatively, the listed elements may be included as a separate unit, located in a remote location, or may be arranged in any suitable manner.

The event sensor 120 of the second preferred embodiment functions to detect the event element 130. The presence of the event element 130 is preferably detected when the event element 130 is within close proximity or alternatively, when the event element 130 is in a line of site, when the event element 130 become active, or when the event element 130 is within an event element zone (defined area around event element). The event sensor 120 may additionally be able to uniquely identify a particular event element 130 (e.g. distinguish a first event element 130 from a second event element 130). The event sensor 120 may additionally send a communication signal to the event element 130 and/or receive a communication signal from the event element 130. The event sensor 120 is preferably a radio frequency identification (RFID) tag reader, but alternatively may be an infrared (IR) transmitter and/or receiver, Hall-effect sensor, a barcode scanner, a contact sensor, capacitive sensor, digital camera, wireless communicator, or any suitable device allowing for sensing or communication with an event element 130. Preferably, the event sensor 120 is attached to the recreational vehicle 110 and arranged to sense the event element 130 when the vehicle 110 moves over and/or near the event element 130. Alternatively, the event sensor 120 may be integrated into other areas of the vehicle 110 such as an object that functions as or represents a gas tank inlet, tire, engine, or any suitable part of the vehicle. Multiple event sensors 120 may alternatively be used, and the multitude of event sensors may be any suitable combination of sensor devices and locations.

The event element 130 of the second preferred embodiment functions as an object of the game. The event element 130 is preferably a separate object from the vehicle 110, and is preferably portable so that the event element 130 may be positioned and repositioned within a playing field (such as a backyard). The event element 130 preferably indicates a single point (such as for an object) or alternatively, the event element 130 may define a zone or area (such as a mat). The event element 130 may alternatively be integrated into an environment, be a part of the car, or any be located in any suitable location. As an additional alternative, the event element 130 may be integrated into a second object that a user may interact with (such as a real or simulated gas pump, air pump, wrench, or any suitable object). The event element 130 preferably includes devices or methods such that it can be sensed by the event sensor 120 and, more preferably, includes devices or methods such that it can be sensed and uniquely identified by the event sensor 120. As another addition, the event element 130 may be dynamic, able to change operation state (e.g. activated or deactivated). The dynamic event element 130 may additionally include a power source 132 to enable the event element 130 to move, to change a visual display, to play a sound, to communicate to a remote control, and/or to take any other suitable action. As an example, the event element 130 may be a "traffic light" that changes from a "red light" to a "green light". The event element 130 preferably includes a radio frequency identification (RFID) tag to be sensed by the event sensor 120, but alternatively may be an infrared (IR) transmitter and/or receiver, a magnet, a barcode, coded graphic, an LED, wireless communicator, or any suitable device allowing for sensing or communication by an event sensor 120.

The processor 140 of the second preferred embodiment functions to operate the logic of the system 100. The processor 140 is preferably connected to the event sensor 120. The processor 140 is preferably a digital controller, but may alternatively be an analog controller, a mechanical controller, or any other suitable controller. The processor 120 is preferably located in the recreational vehicle 110, but may alternatively be located in a remote area. Further, if located in a remote area, the processor 140 may be a central processor separate from the recreational vehicle 110 and adapted to function as the processor 140 for both the recreational vehicle 110 and additionally for any additional vehicles, dynamic event elements, and/or any suitable part of the system 100. The processor 140 may additionally be connected to a game interface 160, vehicle control system, steering subsystem of the recreational vehicle, propulsion subsystem, and/or any suitable vehicle part or device. The processor 140 preferably operates the game program 150.

The game program 150 of the second preferred embodiment functions to define the interactions a user experiences while using the system 100. The game program 150 is preferably stored in memory and, more preferably, stored in a removable memory device such as a USB or a game cartridge, which enables game programs to be changed by the user. Additionally, the game program 150 may be stored within a memory key 180, as discussed below. The game program 150 may alternatively be stored within the processor 140, designed into the electrical hardware, or be integrated into any suitable portion of the system. The game program 150 preferably uses a game program input 152 that is a signal from the event sensor 120 based on the detection of an event element 130, and when an event element 130 is detected by an event sensor 120 that preferably alters the operation of the game program 150. The game program 150 may be designed to implement any suitable game, but three preferable design variations include: task response, story alteration, and action based.

Figure 7:
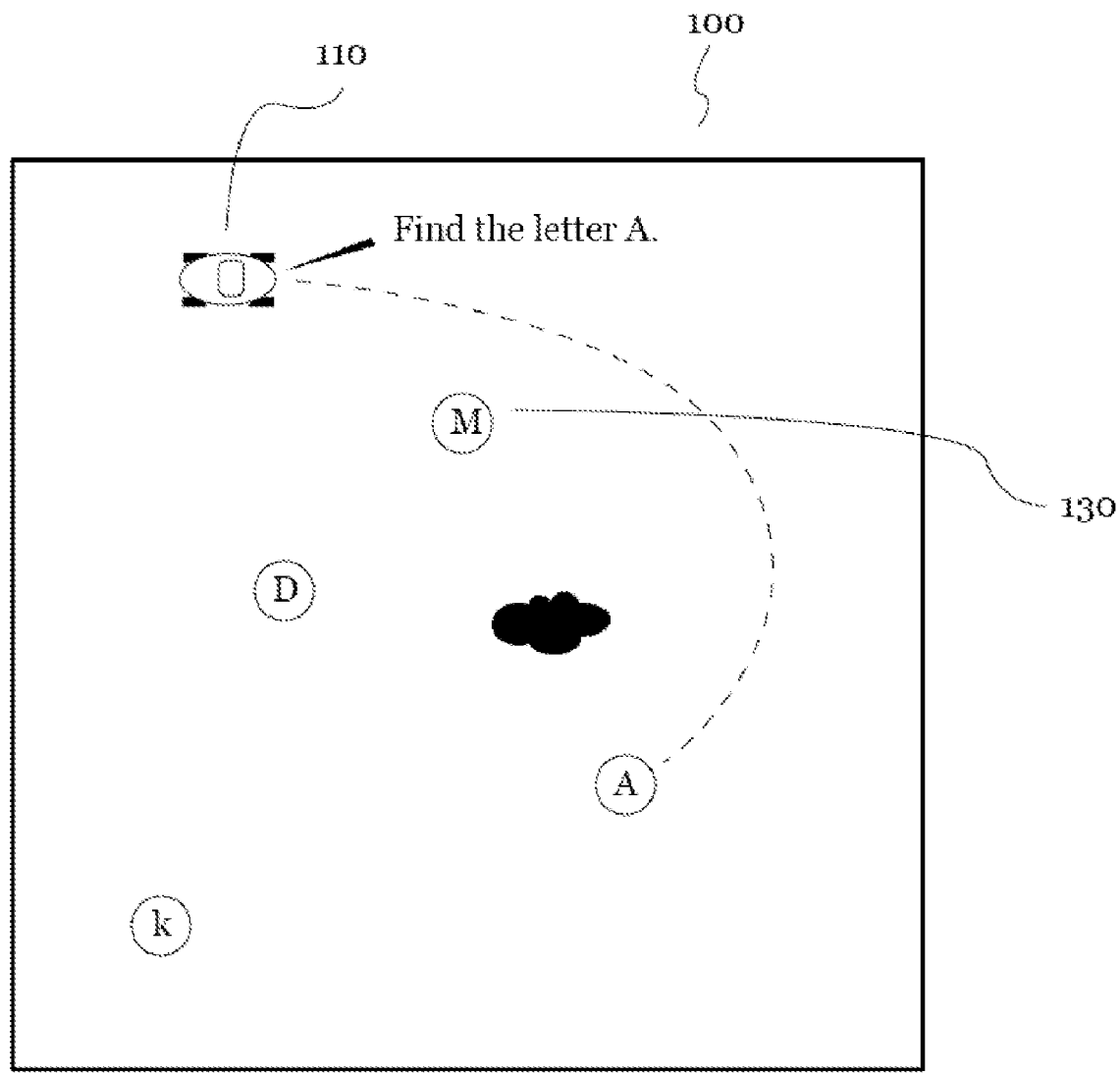
FIG. 7 is a first variation of the entertainment system of the second preferred embodiment configured with an option selection game program.

As shown in FIG. 7, the task response variation of the game program 15 preferably interprets the game program input 152 as a response to a task or question of the game. The user preferably directs the recreational vehicle 110 near (or over) an event element 130, and the event element 130 uniquely represents the response the user wishes to provide or select. As an example, the game program 150 may ask the user to answer a multiple choice question; the user drives to the event element 130 that represents the answer to the question; and the system game program determines a correct response based on the user response. As another alternative example, the user may be posed with the challenge of "collecting" (driving over) objects in a particular order (e.g. alphabetical), and the order the user drives over the event elements would represent the order that is their response, or the event element may represent any suitable option for a multiple choice game or puzzle.

The story alteration variation of the game program 150 preferably alters a storyline based on game program input 152. A story is preferably communicated visually, audibly, and/or in any suitable manner. The story may progress only as the user passes near the event element 130, the story may alter based on the sensing of event elements 130, the story may require the user to make choices (as a combination of the option selection variation and the story alteration), or any suitable story based game using event elements 130 as input. As an example, a speaker in the vehicle may audibly tell the story of a school bus that needs to pick up children (represented by dolls). When the user drives to the next doll and places the doll (the "event element") into the vehicle, the speaker may audibly tell the story of that particular child. As another example, a light on the instrument panel of the vehicle may warn that the engine needs to be repaired with a wrench (represented by a plastic wrench). When the user opens the hood of the vehicle and places the wrench (the "event element") near the engine, the vehicle may reset the "engine warning light" of the vehicle. As yet another example, the vehicle may "run out of gas" and refuse to move forward (or may severely limit forward speed) until "refilled" with more gas (represented by a plastic fuel pump nozzle). When the user places the fuel pump nozzle (the "event element") near the gas tank inlet of the vehicle, the vehicle may reset the gas gauge and resume forward motion.

Figure 8:
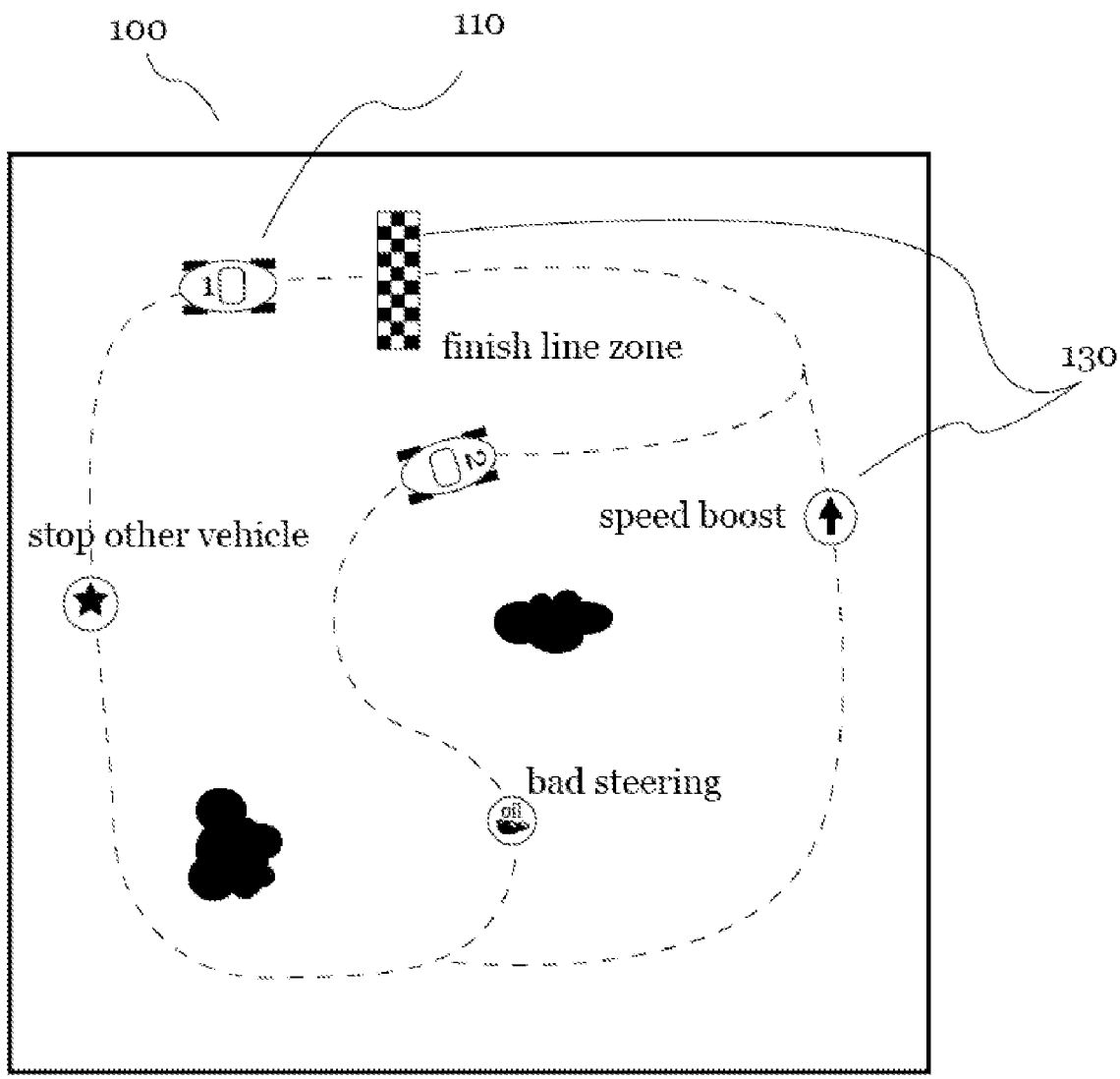
FIG. 8 is a second variation of the entertainment system of the second embodiment configured with an action based game program.

As shown in FIG. 8, the action based variation of the game program 150 preferably involves activating a program action based on the game program input 152. A program action may result in altering the performance of a vehicle (changing speed, acceleration, steering), changing a visual display, playing an audio sound, turning on a vibrational motor, actuating a mechanism, launching a projectile (e.g. water or sponge dart), and/or any suitable action. In one example of an action based variation, the system 100 includes multiple recreational vehicles, and the recreational vehicles preferably collect event elements during a racing scenario to acquire an advantage over the multitude of other vehicles (e.g. faster speed, more simulated fuel, weapons to use against an opponent, slow down the opponent). The action based variation may alternatively by used to simulate driving conditions (e.g. driving over rough terrain, running out of fuel, tuning an engine).

Figure 9:
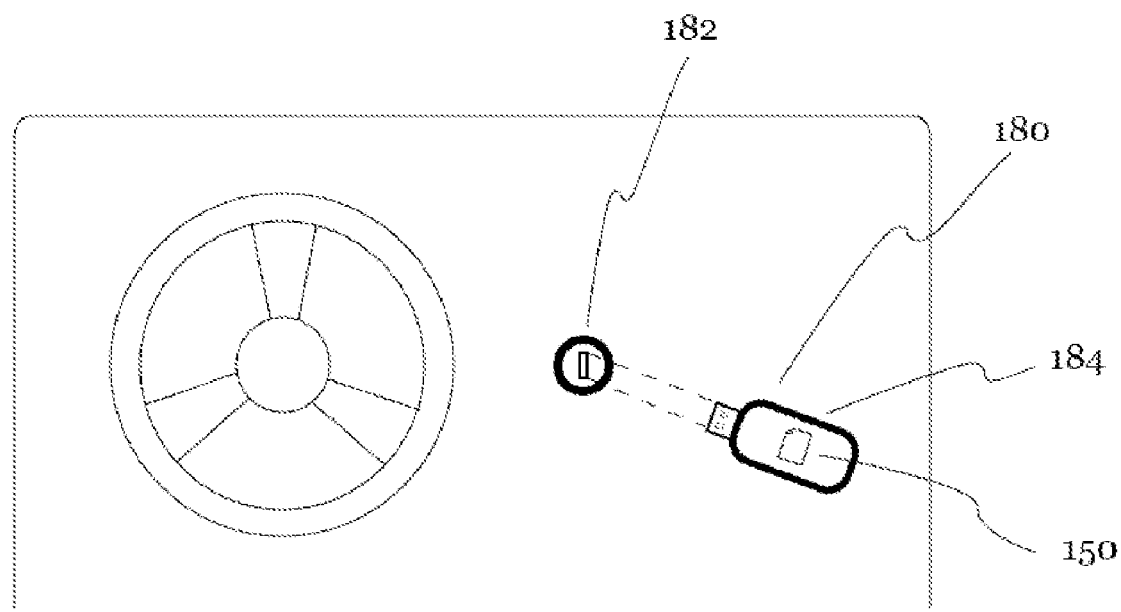
FIG. 9 is a detail schematic view of the memory key of the second preferred embodiment.

Additionally, as shown in FIG. 9, the second preferred embodiment may include a memory key 180 that functions to store the game program 150 and activate a device. The memory key 180 preferably includes a memory storage device 184 such as an external memory device such as a RAM device, an EEPROM, a hard drive, and/or any suitable memory storage device. The memory key 180 preferably includes a game program 150, but alternatively may include multiple game programs 150, resources (digital graphics, audio, or other media) for the game program 150, game program profile data, user profiles, and/or any suitable information. Additionally, data can preferably be saved to the memory key 180, as well as read from the memory key 180. The memory key 180 may additionally connect to a personal computer or other electronic device for uploading information on the user or the vehicle and/or downloading new game programs 150, updates for the game programs 150, or updates for the game interface 160 (discussed below). The memory key 180 additionally functions as a key to "unlock", activate, or turn on the recreational vehicle in a physical manner. The memory key 180 preferably activates a recreational vehicle 110 by being connecting to a complimentary key port 182 in the recreational vehicle 110. And, in this manner, the memory key 180 can also transfer data from the vehicle to a server on the Internet without the need for a wired or wireless connection from the vehicle to the Internet. As an example, the memory key 180 preferably includes a USB memory stick with a male USB connector, and the vehicle 110 preferably includes a female USB connector. The memory key 180 preferably requires being turned after the memory key 180 is connected to the complimentary key port 182 but the memory key 180 may only require to be inserted or any suitable manipulation to activate the recreational vehicle 110. The memory key 180 may alternatively be sensed wirelessly by the recreational vehicle 110. The memory key 180 may activate a device by providing an identification code, completing an electrical connection, mechanically unlocking the device (in a manner similar to a traditional key used with a lock), or in any suitable manner. While the memory key 180 is described for use in the entertainment system 100, the memory key 180 may additionally be used in any suitable device or system.

Additionally, the entertainment system 100 of the preferred embodiment includes a game interface 160 that functions to present information to the user. The game interface preferably communicates through recorded or generated speech audio played through audio speakers, or alternatively, the game interface 160 communicates using text displayed on a screen. The game interface may additionally or alternatively use a graphic display, actuators, gauges, dials, vibration devices, and/or any suitable device to communicate to a user. The game interface may alternatively be part of a driving interface such as force feedback in a steering wheel, gas pedal, brake, or any suitable driving control device. The game interface is preferably controlled by the processor, but may alternatively be controlled by a suitable component.

Additionally, the entertainment system 100 of the second preferred embodiment includes a communication system 170 that functions to enable communication between the recreational vehicle 110 and a second device. The communication system 170 preferably includes a first communicator 172 and at least a second communicator 174. The communication system 170 is preferably capable of two-way communication between the first communicator 172 and the second communicator 174, but one-way communication or any suitable communication scheme may alternatively be used. The first communicator 172 is preferably integrated into the recreational vehicle 110 and is preferably connected to the processor 140. The second communicator 174 may be part of a remote controller, a safety monitor, a second recreational vehicle, or any suitable device. The communication system 170 may use any suitable means of communication such as RF, ultrasound, WIFI, Bluetooth, IR, line of site communication, direct connection (via a wire). The communicator system 170 is preferably used to transfer information, interact with a second vehicle, remotely control a vehicle, and/or any suitable use of wireless communication link. In one example, the second communicator 174 is part of a safety monitor that can communicate a stop command to the recreational vehicle 110 when the vehicle 110 moves outside of a defined boundary or as a result of any safety trigger. In another example, the communication system 180 may be used for an action based game to allow a vehicle to affect the performance or cause any suitable action to a second vehicle.

Although omitted for conciseness, the second preferred embodiment includes every combination and permutation of the various vehicles, the various event elements, the various event sensors, the various processors, the various game programs, and the various physical events of the second preferred embodiment as well as the various vehicles, the various event elements, the various trigger events, the various rules, and the various physical events of the first preferred embodiment.

3. Method for an Interactive Vehicle Experience

Figure 10:
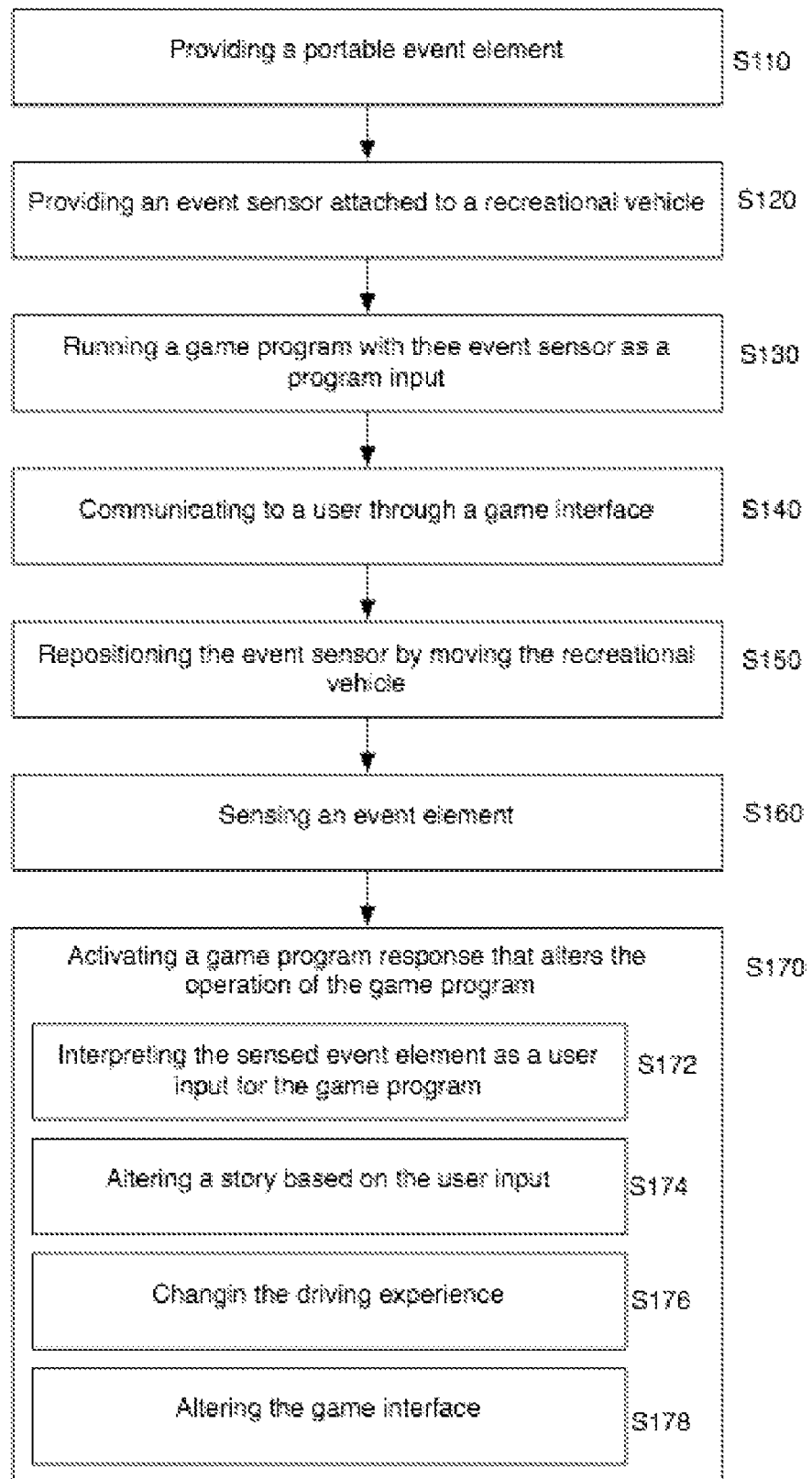
FIG. 10 is a flowchart of the method of the second preferred embodiment.

As shown in FIG. 10, the method for an Interactive Vehicle Experience of the preferred embodiment includes providing a portable event element Silo, providing an event sensor attached to a recreational vehicle that is capable of sensing the event elements S120, running a game program with the event sensor as a program input S130, communicating to a user through a game interface S140, repositioning the event sensor relative to the event element into a detectable range by moving the recreational vehicle S150, sensing an event element S160, and activating a game program response that alters the operation of the game program S170. The method functions to enable interactive games to be played using recreational vehicles.

Step S110, which includes providing a portable event element, functions to provide an object of the game. The event element is preferably a portable object that can be repositioned within a playing field. Multiple event elements may additionally be used, and an event element is preferably distinguishable from a second event element. However, the event elements may alternatively be identical. The event element may be a passive device (without a power source) or it may be dynamic (able to change state, move, communicate, or perform any action requiring power).

Step S120, which includes providing an event sensor that attaches to a recreational vehicle, wherein the event sensor is capable of sensing the event element, functions to enable a vehicle to sense the event element. The event sensor is preferably attached to the bottom of a recreational vehicle to allow sensing of the event element on the ground, but the event sensor may be in any suitable location. Preferably, the recreational vehicle is a four-wheel cart. Alternatively, the first vehicle 12 may be another wheeled vehicle (such as a motorcycle or a bicycle), a watercraft (such as a bumper boat, a jet ski, or a motorboat), an aircraft (such as a small plane or a hovercraft), a tracked vehicle (such as a snowmobile or a tank), or a railed vehicle (such as a train), or a wind, gravity, or human-powered vehicle (such as a kiteboard, a snowboard, or a skateboard). The recreational vehicle may, however, be any suitable vehicle that transports a user.

Step S130, which includes running a game program with the event sensor as a program input, functions to operate a game that defines the rules and interactions of the experience. The game program is preferably executed by a processor. The game program is preferably stored on a removable memory device, preferably a memory key, but may be stored on any suitable memory device.

Step S140, which includes communicating to a user through a game interface, functions to communicate and/or provide feedback to the user. The communication may be performed through audio output, a video screen, a visual display, vibration devices, mechanical motion, and/or any suitable way of interacting with a human.

Step S150, which includes repositioning the event sensor relative to the event element into a detectable range by moving the recreational vehicle, functions to drive or relocate the vehicle to sense the event element. Preferably the recreational element is moved to a position over the event element. The recreational vehicle may alternatively pass near, within a zone defined by the event element, in a direct line of sight, and/or to any location where an event element may be detected.

Step S160, which includes sensing an event element, functions to detect the event element. The event sensor preferably senses the event element using a radio frequency identification (RFID) tag reader, but alternatively may be an infrared (IR) transmitter and/or receiver, Hall-effect sensor, a barcode scanner, a contact sensor, capacitive sensor, digital camera, wireless communicator, or any suitable device allowing for sensing of or communication with an event element.

Step S170, which includes activating a game program response that alters the operation of the game program, functions to use the sensing of the event element as an input to the game program. Step S170 preferably includes the sub-step of interpreting the sensed event element as a user input for the game program S172. A game program response is preferably activated when an event element is sensed by the event sensor, but any suitable timing and rules for the game response may alternatively be implemented (such as activating a game response due to the lack of sensing an event element in a specified amount of time). The operation of the game program additionally may include the sub-steps of altering a story recited through the game interface S174, changing performance of the recreational vehicle S176, and/or altering the game interface based on the user input S178. The game program response may alternatively be any suitable physical or program action.

Step S174, which includes altering a story recited through the game interface, functions to allow a user to affect the outcome or telling of a story. The altering of the story preferably includes selecting a storyline option based on the event element that is sensed.

Step S176, which includes changing performance of the recreational vehicle, functions to alter or simulate a changed behavior of the vehicle. The recreational vehicle preferably experiences increased speed, decreased speed, altered steering, a change to the game interface, and/or any suitable change. The changing of performance preferably simulates altered vehicle performance, creates an advantage for one recreational vehicle of a second recreational vehicle, and/or is used for any suitable purpose.

Step S178, which includes altering the game interface based on the user input, functions to simulate an experience or inform a user of a change in the game. The altered game interface may include a played audio file or video, a changed graphic display, a vibration of a device, an actuated mechanism, or any suitable change to the game interface.

As a person skilled in the art will recognize from the previous detailed description and from the figures and claims, modifications and changes can be made to the preferred embodiments of the invention without departing from the scope of this invention defined in the following claims.

We claim:

1. An entertainment system including:
a recreational vehicle;
an event sensor attached to the recreational vehicle;
an event element adapted to be detected by the event sensor;
a processor connected to the event sensor; and
a game program operated by the processor.

2. The entertainment system of claim 1 further including a user interface controlled by the processor and adapted to communicate to a user.

3. The entertainment system of claim 2 wherein the user interface includes audio output.

4. The entertainment system of claim 1 wherein the event element is adapted to be portable and the event element is detected when an event sensor of a second recreational vehicle is within substantially close proximity to the recreational vehicle.

5. The entertainment system of claim 4 wherein the event element is an RFID tag and the event sensor is an RFID sensor.

6. The entertainment system of claim 4 wherein the game program includes an event that is activated when the event sensor detects the event element.

7. The entertainment system of claim 6 further including at least a second event element, wherein the event sensor is able to differentiate between the event element and the second event element.

8. The entertainment system of claim 7 wherein the event element includes a power source.

9. The entertainment system of claim 7 wherein the event element and the second event element are associated with at least two selected options in a game program.

10. The entertainment system of claim 7 wherein the processor alters the behavior of the recreational vehicle based on the input of the game program.

11. The entertainment system of claim 7 includes a communication system enabling communication of a message, the communication system including a first communicator that is integrated into the recreational vehicle, and a second communicator.

12. The entertainment system of claim 11 wherein the second communicator is a safety communicator able to remotely control the motion of the recreational vehicle.

13. The entertainment system of claim 11 wherein the second communicator is integrated into the second recreational vehicle, and wherein the message is an input to the game program.

14. The entertainment system of claim 13 wherein the processor alters the behavior of the recreational vehicle based on the input of the game program.

15. The entertainment system of claim 7 further including a memory key adapted to store game program resources and act as an activation device for the recreational vehicle.

16. A memory key for a key system having a key port, the memory key comprising:

a key adapted to connect to the key port and activate the device;

a memory storage device adapted for the reading and writing of data through the key port.

* * * * *